United States Patent [19]
Flautt et al.

[11] 3,914,192
[45] Oct. 21, 1975

[54] GLOSS FIBERS COATED WITH A SIZE COMPRISING A FILM-FARMING BINDER AND AN AMINO ACID

[75] Inventors: Martin C. Flautt, Granville; Kevin M. Foley, Hebron; Richard M. Haines, Warsaw, all of Ohio

[73] Assignee: Owens-Corning Fiberglas Corporation, Toledo, Ohio

[22] Filed: Aug. 6, 1973

[21] Appl. No.: 386,143

[52] U.S. Cl. ...... 260/4 R; 260/29.2 E; 260/29.2 EP; 260/29.6 N; 260/29.6 MN; 260/29.7 N; 260/42.16; 428/378
[51] Int. Cl. .................. B32b 17/04; B32b 17/10
[58] Field of Search ........... 117/54, 124 D, 126 GB, 117/126 GQ, 72; 260/29.6 N, 29.6 MN, 29.7 N, 29.2 E, 29.2 EP

[56] References Cited
UNITED STATES PATENTS

| | | | |
|---|---|---|---|
| 2,184,320 | 12/1939 | Simpson | 117/126 GQ |
| 2,688,007 | 8/1954 | Sternman | 117/126 GB |
| 2,796,362 | 6/1957 | Wooding | 117/72 |
| 2,943,011 | 6/1960 | Rayner | 117/72 |
| 3,224,998 | 12/1965 | Kirkconnell | 260/42.16 |
| 3,296,174 | 1/1967 | Pickard | 428/441 |
| 3,325,105 | 6/1967 | Veltman | 241/16 |
| 3,676,287 | 7/1972 | Flautt | 117/126 GB |
| 3,719,520 | 3/1973 | Fujimoto | 117/126 GB |
| 3,769,064 | 10/1973 | Greenlee | 117/49 |
| 3,802,909 | 4/1974 | Rochett | 117/100 B |

OTHER PUBLICATIONS
Chemical Abstracts, Vol. 53:5706a.
Chemical Abstracts, Vol. 72:33324y.

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

A composition for use in the treatment of glass fibers, and preferably in the treatment of glass fibers to form a size coating thereon to facilitate contact of the glass fibers with resinous and elastomeric materials in the manufacture of glass fiber reinforced resins and glass fiber reinforced elastomeric products wherein the size composition is formulated to contain, as the essential ingredients, a film-forming binder and an amino acid as a coupling agent. Bundles of glass fibers sized with the composition of this invention are particularly well suited for impregnation with an elastomer compatible material containing a resorcinol-aldehyde resin component and an elastomer component for use in the manufacture of glass fiber reinforced elastomeric products. Polyamines may also be used as coupling agents instead of the amino acids.

11 Claims, 3 Drawing Figures

GLOSS FIBERS COATED WITH A SIZE COMPRISING A FILM-FARMING BINDER AND AN AMINO ACID

This invention relates to a size composition, and more particularly to a size composition for use in the treatment of glass fibers to improve the processing and performance characteristics of glass fibers in the manufacture of glass fiber reinforced elastomeric products and glass fiber reinforced plastics.

As used herein, the term "glass fibers" is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and nonwoven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

It is well known to combine glass fibers with resins and with elastomeric materials in the manufacture of glass fiber reinforced plastics and in the manufacture of glass fiber reinforced elastomeric products. One of the primary difficulties in the combination of glass fibers with resins and with elastomeric materials has resided in the inability to securely bond the glass fibers to the resin or elastomeric material. It is believed that the inability to establish a secure bond between glass fibers and resins or elastomeric materials stems at least in part from the fact that glass fibers have a completely smooth, rod-like configuration to thereby render it difficult to establish any physical bond between the glass fibers and the resin or elastomeric material. It is believed that the inability to establish a secure bonding relationship also stems from the fact that glass fibers have surfaces which are highly hydrophilic and thus form a thin film of moisture on the individual glass fiber surfaces almost immediately after the glass fibers are formed. This film of moisture serves to destroy any bond, whether chemical or physical, which may otherwise be established between the glass fiber surfaces and the resins or elastomeric materials.

Substantial progress has been made in the treatment of glass fibers for use as reinforcement for resins and for elastomeric materials. It is now conventional practice to coat glass fibers, preferably as they are formed, with a size composition to impart to the individual glass fiber filaments the desired degree of lubricity to prevent destruction of the fibers through mutual abrasion without destroying the fibrous characteristics of the glass fibers. The thin film or size coating applied to the individual glass fibers not only serves to protect the fibers from mutual abrasion as described above, but also tends to impart to the glass fibers somewhat hydrophobic surface characteristics to thereby prevent or at least substantially minimize the formation of a thin moisture film on the glass fiber surfaces.

Size compositions now in commercial use in the manufacture of glass fiber reinforced resins and glass fiber reinforced elastomeric materials embody a coupling agent, preferably in the form of an organo silicon compound. Such organo silicon coupling agents most frequently take the form of an organo silane containing 1 to 3 readily hydrolyzable groups such as alkoxy or halogen groups, and at least one and up to three organic groups attached directly to the silicon atom in which the organic groups are substituted by a functional group, such as an amino group, an epoxy group, a mercapto group or the like. It is generally believed that the hydrolyzable groups are subjected to hydrolysis in the size composition to thereby permit the silicon atom of the silane to be chemically bonded to the glass fiber surface while the organic group extends outwardly from the glass fiber surface.

While the use of such silanes as described above has represented a substantial improvement in the manufacture of glass fiber reinforced resins and glass fiber reinforced elastomeric products, the silanes used commercially at the present time are quite expensive and thus can be used in only limited amounts without significantly contributing to the costs of the reinforced materials.

It is accordingly an object of the present invention to provide a composition for use in the treatment of glass fibers to improve the processing and performance characteristics of glass fibers for use in the manufacture of glass fiber reinforced resins and glass fiber reinforced elastomeric products.

It is a related object of the invention to provide a composition for use in the treatment of glass fibers to improve the bonding relationship with elastomeric materials in the manufacture of glass fiber reinforced elastomeric products.

It is another object of the invention to provide a composition for use in the treatment of glass fibers which is effective to promote compatibility between treated glass fibers and thermoplastic and thermosetting resins in the manufacture of glass fiber reinforced resinous products.

It is another and more specific object of the present invention to provide a composition for use in the treatment of glass fibers in which the composition is formulated to contain an inexpensive coupling agent which is capable of establishing a secure bonding relationship between the treated glass fibers and elastomeric and resinous materials.

It is a further object of the invention to provide treated glass fibers which can be employed in the manufacture of glass fiber reinforced elastomeric products and glass fiber reinforced resin products.

These and other objects and advantages of the invention will appear more fully hereinafter and for the purpose of illustration, and not of limitation, embodiments of the invention are shown in the accompanying drawings in which.

Figure 1:
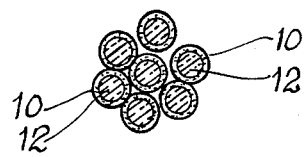
FIG. 1 is a cross-sectional view of glass fibers which have been sized with the composition of this invention.

The concepts of the present invention reside in a composition for use in the treatment of glass fibers to form a thin film or size coating on the individual glass fiber filaments in which the composition is formulated to contain a film-forming binder and, as a coupling agent, an amino acid. It has surprisingly been found that amino acids are effective as coupling agents to establish a secure bonding relationship between the treated glass fibers and resinous materials and elastomeric materials with which the treated glass fibers are combined in the manufacture of glass fiber reinforced resinous products and glass fiber reinforced elastomeric products. Without limiting the present invention as to theory, it is believed that the effectiveness of the amino acids as coupling agents is due at least in part to the ability of amino acids to form polyamides in situ on the glass fiber surfaces by alignment of the amino acids in a head-to-toe relationship whereby the carboxy group of the molecule of the amino acid reacts with a primary or secondary amino group of an adjacent molecule to form an amide linkage.

In the practice of the present invention, a number of amino acids can be employed as coupling agents. Preferably, use is made of amino acids containing terminal amino groups such as those having the general formula

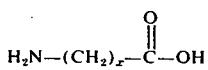

wherein $x$ is an integer from 1 to 11. Representative of suitable amino acids include glycine, beta-alanine, 3-amino-butyric acid, 4-aminopentanoic acid, etc. Also contemplated for use in the practice of this invention are the natural amino acids containing more than one amino group, such as asparagine, lysine, etc.

As indicated above, the size composition of this invention is formulated to include, in addition to the amino acid coupling agent described above, a film forming binder in the form of an aqueous dispersion. A number of such binders can be employed in the practice of this invention and include water soluble and water insoluble resinous materials. In the preferred practice of this invention, the film forming binder is a polyolefin, such as polyethylene, polypropylene, copolymers of ethylene and propylene, as well as numerous others. One film forming binder which has been found particularly well suited for use in the composition of this invention is a polyethylene marketed by Commercial Solvents Corporation under the trademark "Quaker Quasoft HS-60". However, other film forming binders can be employed, including polymers of butadiene; resinous copolymers of maleic anhydride and unsaturated monomers such as a conjugated diene, alkyl acrylate or methacrylate or a vinyl aromatic monomer; polyvinyl alcohol; polyvinyl acetate; polyvinyl chloride; polyepoxides; polyesters; and other well-known film forming materials.

The amount of the film forming binder and the amino acid coupling agent each in the composition of this invention can be varied within wide limits. For best results, it is preferred to employ a composition which contains the binder in an amount within the range of 2 to 25% by weight based upon the weight of the composition, and the amino acid coupling agent in an amount within the range of 0.5 to 5% by weight of the dispersion. However, since the amino acids employed in the practice of this invention as coupling agents are significantly less expensive than the organo silicon coupling agents employed by the prior art, greater amounts of the amino acids can be used if desired.

As is known to those skilled in the art, the amino acids are generally water soluble and thus can simply be dissolved in an aqueous dispersion containing the film forming binder. However, is has been found that the stability of the size composition of this invention can be significantly improved by formulating the composition to include an organic solubilizing agent which serves to prevent coagulation of the dispersion of the film forming binder by the amino acid. For this purpose it has been found that secondary and tertiary lower alkanols containing 3 to 6 carbon atoms can be employed. Representative alkanols include isopropanol, isobutanol, tert-butanol, etc. Since the solubilizing agents are either secondary or tertiary alcohols, they are sufficiently inert, with respect to the amino acids, to prevent or substantially minimize ester formation. The amount of solubilizing agent employed is not critical to the practice of this invention and should be an amount to secure a stable system. Best results are usually achieved when the composition contains from 0.1 to 6.0% by weight of the solubilizing agent.

The composition of this invention is preferably applied to glass fibers as they are formed, but can also be applied after forming, if desired, to form a thin film or coating on the individual glass fiber filaments. As described above, it is believed that the amino acids tend to react to form polyamides on the glass fiber surfaces as the treated glass fibers are subjected to an elevated temperature such as during drying and/or curing or vulcanizing of the treated glass fibers in combination with elastomeric materials or resinous materials in the manufacture of glass fiber reinforced elastomeric products and glass fiber reinforced resinous products. Thus, the combination of the film forming binder and the amino acid is believed to form a tough film on the glass fiber surfaces which is capable of securely integrating the treated glass fibers with elastomeric and resinous materials.

In the preferred practice of the present invention, the glass fibers are coated in forming with the size composition of this invention and the resulting coated fibers are dried at an elevated temperature and preferably a temperature within the range of 100° to 300°C. The resulting coated fibers are illustrated in FIG. 1 wherein the size composition of this invention forms a thin film or coating 10 on the individual glass fiber filaments 12. As described above, the thin film or size coating 10 on the individual glass fiber filaments 12 imparts to the glass fiber filaments a desired balance of lubricity and bonding characteristics without destroying the fibrous characteristics or appearance of the glass fibers.

In the practice of this invention, the glass fibers which have been individually coated with the size composition of this invention, are preferably formed into bundles, such as yarns, threads, cords or fabrics, by plying strands of glass fibers together and twisting the resulting strands. The resulting bundles can be directly combined with elastomeric materials in the manufacture of glass fiber reinforced elastomeric products without further treatment whereby the thin size coating serves to tie the glass fibers to the elastomeric material. However, in accordance with the preferred practice of this invention, the glass fibers which have been sized with the composition of this invention, are preferably formed into bundles and the bundles subjected to impregnation with an elastomer compatible material, preferably in the form of a blend of a resorcinol-aldehyde resin component and at least one elastomer component. Such impregnating compositions are well known to those skilled in the art and are described in U.S. Pat. Nos. 3,391,052; 3,402,064; 3,424,608; 3,506,476; 3,533,830; 3,567,671; 3,591,357 and numerous others. While the relative proportions of the resorcinol-aldehyde resin and the elastomer component are not critical, it is generally preferred to employ an impregnant containing from 2 to 10 parts by weight of the resorcinol-aldehyde resin for each 15 to 60 parts by weight of the elastomer component.

Figure 2:
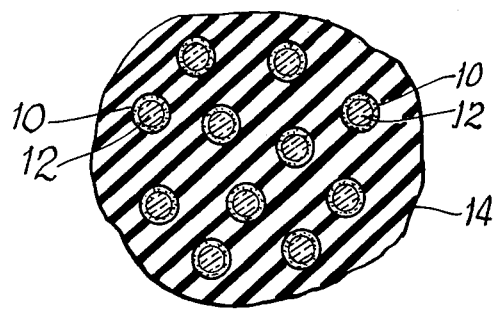
FIG. 2 is a cross-sectional view of a bundle of glass fibers in which the individual glass fibers have been sized with the composition of this invention and formed into a bundle which is impregnated with an elastomer compatible material.

Impregnation of the bundles of glass fibers which have been previously sized with the composition of this invention can be carried out in any desired manner. It is generally preferred to employ the immersion impregnation technique as described in U.S. Pat. No. 3,424,608, in which the bundle of sized glass fibers is immersed in an aqueous bath of the impregnating composition and subjected to a sharp bend while immersed in the bath to open the bundle and thereby facilitate complete penetration of the bundle by the solids of the impregnating composition. In the resulting bundle, which is illustrated in FIG. 2 of the drawing, the impregnant 14 serves to completely penetrate the bundle to fill the interstices between the individually sized glass fiber filaments and to separate the sized filaments each from the other. It has been found that impregnated bundles treated in this manner are particularly well suited for use as glass fiber reinforcements in elastomeric products, such as rubber tires, drive belts, timing belts and like products.

However, it will be understood by those skilled in the art that glass fibers which have been sized with the composition of this invention can also be employed as reinforcement of resinous materials, such as polyepoxides, polyesters, polyamides, melamine-urea or phenolic aldehyde resins and like thermoplastic and thermosetting resins. It is believed that the tough film which is formed on the individual glass fiber surfaces by the application of the size coating of this invention serves to securely bond the glass fiber surfaces to such resinous materials.

Figure 3:
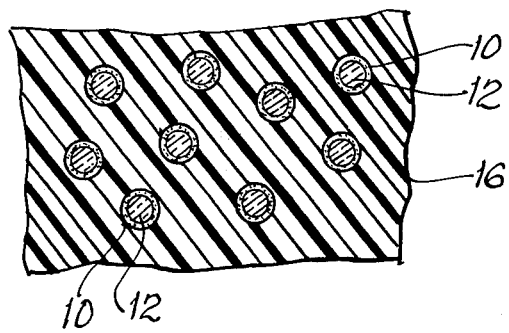
FIG. 3 is a cross-sectional view of glass fibers employed as reinforcement for a resinous material.

A glass fiber reinforced resinous product is illustrated in FIG. 3 of the drawing. As can be seen from this figure, a resinous material 16 forms a continuous phase in which the individually coated or sized glass fiber filaments 12 having the size coating 10 on the surfaces thereof are dispersed.

While not equivalent to the amino acid coupling agents described above, it has also been found that polyamines containing poly(oxyalkylene) groups can also be employed in coupling agents to promote a secure bonding relationship between glass fibers and resinous and elastomeric materials in the manufacture of glass fiber reinforced resinous products and glass fiber reinforced elastomeric products. The polyamines contemplated for use in the present invention have the general formula

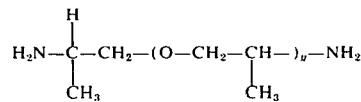

wherein $y$ is an integer to provide an average molecular weight of 200 to 2000. The foregoing amines are commercially available from Jefferson Chemical Co. and have average molecular weights ranging up to about 2000.

It has surprisingly been found that the foregoing amines can be substituted for the amino acid coupling agent of this invention to provide a size composition which is similarly capable of establishing a secure bonding relationship between glass fibers and elastomeric or resinous materials.

The amines described above have been used for a number of years as glass fiber lubricants in glass fiber size compositions. However, such compositions have always embodied, in addition to a film forming material or binder, an organo silicon compound anchoring agent and, thus, the prior art has not recognized that these amines are effective as coupling agents in their own right in the absence of an organo silicon type anchoring agent.

Having described the basic concepts of the present invention, reference is now made to the following examples which are provided by way of illustration, and not by way of limitation, of the practice of the invention in formulating the composition of the invention and the treatment of glass fibers in accordance with the invention.

EXAMPLE 1

This example demonstrates the effectiveness of amino acids as coupling agents in treated glass fibers for use as reinforcement for elastomeric materials as compared to organo silicon compounds of the type widely used by the prior art.

A series of seven size compositions was formulated, varying only in the coupling agent employed. The components of each of the size compositions were as follows:

Size Composition

| | |
|---|---|
| Polyethylene (Quaker Quasoft HS-60) | 12% by wt. |
| Solubilizing agent (isopropanol) | 1.5% by wt. |
| Coupling agent | 1.5% by wt. |
| Water | 85% by wt. |

Each of the foregoing size compositions was applied to glass fibers as the glass fibers were formed, and the resulting coated glass fibers collected in the form of multi fiber strands, were dried at an elevated temperature of from about 225°–275°F. Thereafter, the sized glass fiber strands were formed into bundles, for example, rovings, yarns and cords, and the bundles were impregnated with a composition of the type described in U.S. Pat. No. 3,567,671 and formulated as follows:

Impregnating Composition

| | Parts by Weight |
|---|---|
| Resorcinol-Formaldehyde resin (Penacolite R2170) 75% solids | 48 |
| Butadiene-styrene vinyl pyridine | |

Impregnating Composition-Continued

| | Parts by Weight |
|---|---|
| terpolymer (Gentac FS) 42% solids | 900 |
| Vinyl chloride-vinylidene chloride copolymer (Dow Latex 874) 50% solids | 350 |
| Micro-crystalline paraffin wax (Vultex Wax Emulsion No. 5) 56% solids | 200 |

Each of the impregnated bundles thus produced was then molded between two strips of rubber and the bundles were then subjected to adhesion tests to determine the amount of force required to pull the impregnated bundle from between the strips of rubber. The results of these tests are shown in the following table:

TABLE I

| Coupling Agent | Adhesion (pounds) |
|---|---|
| Glycine | 43 |
| Beta-alanine | 45 |
| 3-aminobutyric acid | 47 |
| Gamma-aminopropyltriethoxysilane | 12 |
| N-(beta-aminoethyl)gamma-aminopropyltriethoxysilane | 20 |
| Gamma-glycidoxypropyltrimethoxysilane | 28 |
| Gamma-mercaptopropyltrimethoxysilane | 31 |

As can be seen from the foregoing Table, the use of amino acid coupling agents in accordance with the practice of this invention provides glass fiber bundles which have markedly improved adhesion to rubber as compared to glass fiber bundles in which the glass fibers were sized with the conventional organo silicon coupling agents of the prior art.

EXAMPLE 2

Using the procedure described in Example 1, a size composition is prepared as follows:

Size Composition

| Polyethylene (Quaker Quasoft HS-60) | 10.0% by wt. |
|---|---|
| Glycine | 1.2% by wt. |
| Water | 88.8% by wt. |

This composition was applied to glass fibers as they were formed; the resulting sized glass fibers were then dried at an elevated temperature, formed into bundles and then impregnated with an impregnating composition of the type described above formulated to contain a dicarboxylated butadiene-styrene copolymer.

Impregnating Composition

| | Parts By Weight Solids |
|---|---|
| Resorcinol-formaldehyde resin | 6 |
| Butadiene-styrene vinyl pyridine terpolymer | 30 |
| Dicarboxylated butadiene-styrene resin (Pliolite 4121) | 20 |
| Microcrystalline paraffin wax | 7 |

After drying and curing of the resulting impregnated bundles, the bundles were combined with rubber to test the adhesion of the impregnated bundle to the rubber. Comparable results were obtained.

EXAMPLE 3

This example illustrates the use of a polyamine as a coupling agent for glass fibers as reinforcement for resinous materials.

Using the procedure described in Example 1, a series of size compositions are formulated with various coupling agents in accordance with the following

Size Composition

| Polyethylene (Quaker Quasoft HS-60) | 12.0% by wt. |
|---|---|
| Solubilizing agent (isopropanol) | 1.5% by wt. |
| Coupling agent | 1.5% by wt. |
| Water | 85.0% by wt. |

Glass fibers were then sized with each of the size compositions and incorporated with a polyester in the manufacture of glass fiber reinforced polyester rods. Each rod thus produced was tested for flex strength to compare the adhesion of the sized glass fibers with the polyester resinous material. The results of these tests are shown in the following table:

Table II

| Coupling Agent | Flex strength (psi) |
|---|---|
| Jeffamine D 400 | 173,700 |
| Gamma-aminopropyltriethoxy silane | 92,500 |
| Gamma-glycidoxypropyltrimethoxy silane | 104,400 |
| Gamma-mercaptopropyltrimethoxy silane | 132,100 |
| Gamma-methacryloxypropyltrimethoxy silane | 192,100 |

The Jeffamine D 400 is an amine having the formula

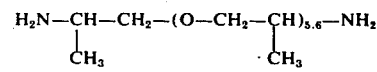

having an average molecular weight of 400.

As can be seen from the foregoing Table, the polyamine coupling agent of the present invention provided a glass fiber reinforced polyester rod having improved flex strength as compared to all of the organo silicon compounds used as coupling agents with the exception of the gamma-methacryloxypropyltrimethoxy silane.

As will be appreciated by those skilled in the art, the size composition described in Example 1 can also be employed in the treatment of glass fibers for use as reinforcement for resinous material in addition to glass fibers for use as reinforcement for elastomeric materials. Similarly, glass fibers treated in accordance with the procedure of Example 3 can likewise be subjected to impregnation with an impregnating composition of the type described above in the manufacture of bundles of glass fibers for use as reinforcement for elastomeric materials.

Additional size compositions of this invention are illustrated by the following examples:

EXAMPLE 4

Size Composition

| Saturated polyester resin | 7.0% by wt. |
|---|---|
| Fatty acid amine wetting agent (Nopcogen 16L) | 0.5% by wt. |
| 4-Aminopentanoic acid | 2.5% by wt. |
| Water | 90.0% by wt. |

EXAMPLE 5

Size Composition

| | |
|---|---|
| Polyvinyl alcohol | 8.0% by wt. |
| Glycine | 2.0% by wt. |
| Water | 90.0% by wt. |

EXAMPLE 6

Size Composition

| | |
|---|---|
| Polyvinyl chloride | 4.0% by wt. |
| 3-Aminobutanoic acid | 1.5% by wt. |
| Emulsifier | 3.0% by wt. |
| Water | 91.5% by wt. |

The above size compositions can be used to treat glass fibers as described in Examples 1 to 3 to promote a secure bonding relationship between glass fibers and resinous or elastomeric materials.

In fabricating the combinations of glass fibers treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber reinforced belts or in the manufacture of rubber tires reinforced with cords of glass fibers. The combinations of glass fibers and elastomeric materials are then processed in a conventional manner by molding and curing under heat and pressure or by vulcanizing for advancement of the elastomeric materials to a cured or vulcanized state while in combination with the treated glass fibers whereby the bundles of glass fibers become strongly integrated with the elastomeric material in the glass fiberelastomeric product.

It will be understood that invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

We claim:

1. Glass fibers having a thin coating thereon, said coating being formed from a film-forming binder selected from the group consisting of polyolefins; polymers of butadiene; copolymers of maleic anhydride and an unsaturated monomer selected from the group consisting of a conjugated diene, an alkyl acrylate, an alkyl methacrylate and a vinyl aromatic monomer; polyvinyl alcohol; polyvinyl acetate; polyvinyl chloride; polyepoxides and polyesters and an amino acid containing 2 to 12 carbon atoms, with the coating containing 0.5 to 5 parts by weight of the amino acid for each 2 to 25 parts by weight of the binder.

2. Glass fibers as defined in claim 1 wherein the binder is a polyolefin.

3. Glass fibers as defined in claim 1 wherein the binder is polyethylene.

4. Glass fibers as defined in claim 1 wherein the amino acid has the formula $$H_2N-(CH_2)_x-\overset{O}{\overset{\|}{C}}-OH$$

wherein $x$ is an integer from 1 to 11.

5. A bundle of glass fibers for use as reinforcement for elastomeric materials comprising a plurality of glass fibers, a thin film coating on the surfaces of the individual glass fibers, said coating formed from a film-forming binder selected from the group consisting of polyolefins; polymers of butadiene; copolymers of maleic anhydride and an unsaturated monomer selected from the group consisting of a conjugated diene, an alkyl acrylate, an alkyl methacrylate and a vinyl aromatic monomer; polyvinyl alcohol; polyvinyl acetate; polyvinyl chloride; polyepoxides and polyesters and an amino acid containing 2 to 12 carbon atoms, with the coating containing 0.5 to 5 parts by weight of the amino acid for each 2 to 25 parts by weight of the binder, and an impregnant in the bundle, said impregnant comprising a blend of a resorcinolaldehyde resin and an elastomer.

6. A bundle of glass fibers as defined in claim 5 wherein the binder is a polyolefin.

7. A bundle of glass fibers as defined in claim 5 wherein the binder is polyethylene.

8. A bundle of glass fibers as defined in claim 5 wherein the amino acid has the formula $$H_2N-(CH_2)_x-\overset{O}{\overset{\|}{C}}-OH$$

wherein $x$ is an integer from 1 to 11.

9. A bundle of glass fibers as defined in claim 5 wherein the blend contains 2 to 10% by weight of the resorcinolaldehyde resin and 15 to 60% by weight of an elastomer.

10. In a glass fiber reinforced elastomeric product in which an elastomeric material constitutes a continuous phase through which the glass fibers are dispersed, the improvement in the bonding relationship between the glass fibers and the elastomeric material comprising a coating on the individual glass fibers, said coating being formed from a film-forming binder selected from the group consisting of polyolefins; polymers of butadiene; copolymers of maleic anhydride and an unsaturated monomer selected from the group consisting of a conjugated diene, an alkyl acrylate, an alkyl methacrylate and a vinyl aromatic monomer; polyvinyl alcohol; polyvinyl acetate; polyvinyl chloride; polyepoxides and polyesters and an amino acid containing 2 to 12 carbon atoms, with the coating containing 0.5 to 5 parts by weight of the amino acid for each 2 to 25 parts by weight of the binder.

11. A product as defined in claim 10 wherein the glass fibers are in the form of a bundle and the bundle includes an impregnant therein, said impregnant comprising a blend of a resorcinol-aldehyde resin and an elastomer.

* * * * *